US012186705B2

(12) United States Patent
Tayebi et al.

(10) Patent No.: US 12,186,705 B2
(45) Date of Patent: Jan. 7, 2025

(54) MODULARIZED SUBSEA SEAWATER DESALINATION SYSTEM

(71) Applicant: Waterise AS, Oslo (NO)

(72) Inventors: Davoud Tayebi, Oslo (NO); Tom Gunnar Omberg, Oslo (NO); Morten Hana, Oslo (NO); Jo Jernsletten, Haslum (NO)

(73) Assignee: Waterise AS (NO)

( * ) Notice: Subject to any disclaimer, the term of this patent is extended or adjusted under 35 U.S.C. 154(b) by 601 days.

(21) Appl. No.: 16/973,214

(22) PCT Filed: Oct. 14, 2019

(86) PCT No.: PCT/NO2019/050217
§ 371 (c)(1),
(2) Date: Dec. 8, 2020

(87) PCT Pub. No.: WO2020/076164
PCT Pub. Date: Apr. 16, 2020

(65) Prior Publication Data
US 2021/0220775 A1     Jul. 22, 2021

(30) Foreign Application Priority Data
Oct. 12, 2018 (NO) .................................. 20181317

(51) Int. Cl.
*B01D 61/08*      (2006.01)
*B01D 61/02*      (2006.01)
(Continued)

(52) U.S. Cl.
CPC ........... *B01D 61/08* (2013.01); *B01D 61/025* (2013.01); *B01D 61/10* (2013.01); *B01D 61/12* (2013.01);
(Continued)

(58) Field of Classification Search
CPC ...... B01D 61/08; B01D 61/025; B01D 61/10; B01D 61/12; B01D 2313/06;
(Continued)

(56) References Cited

U.S. PATENT DOCUMENTS 3,456,802 A * 7/1969 Cole ...................... B01D 61/10
                                               203/DIG. 17
4,194,857 A * 3/1980 Chateau ................ E21B 43/017
                                               405/203
(Continued)

FOREIGN PATENT DOCUMENTS

| EP | 0968755 | 1/2000 |
| NO | 20140844 | 1/2016 |

(Continued)

OTHER PUBLICATIONS

Norwegian Search Report for Norwegian Application No. 20181317 dated May 10, 2019 (3 pages).
(Continued)

*Primary Examiner* — Terry K Cecil
(74) *Attorney, Agent, or Firm* — Conley Rose, P.C.

(57) ABSTRACT

A subsea desalination template includes subsea desalination module zones and module fluid couplings. A desalinated water outlet is in fluid connection with the module fluid coupling in the subsea desalination module zone. Subsea desalination modules with reverse osmosis cartridges are in fluid connection with a subsea template fluid coupling, a seawater inlet section, and a concentrated seawater outlet section. A transport pump assembly for desalinated water in a pump module is in fluid connection with the subsea desalination template and the desalination modules. A seawater circulation pump is in fluid connection with a seawater side of the at least one reverse osmosis cartridge. A desali- (Continued)

nated water pipeline conveys fluid from the desalinated water transport pump assembly to a location above sea level.

16 Claims, 12 Drawing Sheets

(51) Int. Cl.
| | | |
|---|---|---|
| *B01D 61/10* | (2006.01) | |
| *B01D 61/12* | (2006.01) | |
| *C02F 1/26* | (2023.01) | |
| *C02F 1/44* | (2023.01) | |
| *C02F 103/08* | (2006.01) | |

(52) U.S. Cl.
CPC .............. *C02F 1/265* (2013.01); *C02F 1/441* (2013.01); *B01D 2313/06* (2013.01); *B01D 2313/13* (2013.01); *B01D 2313/54* (2013.01); *B01D 2315/06* (2013.01); *B01D 2317/06* (2013.01); *C02F 2103/08* (2013.01); *C02F 2201/004* (2013.01); *C02F 2201/006* (2013.01); *C02F 2201/007* (2013.01); *C02F 2209/03* (2013.01); *C02F 2209/05* (2013.01); *C02F 2209/40* (2013.01); *C02F 2303/14* (2013.01); *Y02A 20/131* (2018.01)

(58) Field of Classification Search
CPC ............ B01D 2313/13; B01D 2313/54; B01D 2313/56; B01D 2315/06; B01D 2317/06; C02F 1/265; C02F 1/441; C02F 2103/08; C02F 2201/004; C02F 2201/006; C02F 2201/007; C02F 2209/03; C02F 2209/05; C02F 2209/40; C02F 2303/14; Y02A 20/131

See application file for complete search history.

(56) References Cited

U.S. PATENT DOCUMENTS

| | | | | |
|---|---|---|---|---|
| 5,366,635 | A * | 11/1994 | Watkins | ................. C02F 1/441 |
| | | | | 210/651 |
| 6,099,735 | A * | 8/2000 | Kelada | .................. B01D 61/08 |
| | | | | 210/257.2 |
| 9,517,951 | B2 * | 12/2016 | Lim | ....................... B01D 61/08 |
| 2008/0190849 | A1 | 8/2008 | Vuong | |
| 2014/0339169 | A1 | 11/2014 | Zeren | |
| 2016/0185626 | A1 | 6/2016 | Glynn | |

FOREIGN PATENT DOCUMENTS

| | | |
|---|---|---|
| WO | WO 9004084 | 4/1990 |
| WO | WO 9412267 | 6/1994 |
| WO | WO 9733832 | 3/1996 |
| WO | WO 2012025656 | 3/2012 |
| WO | WO 2012131621 | 10/2012 |
| WO | WO 2016010907 | 1/2016 |

OTHER PUBLICATIONS

International Search Report PCT/NO2019/0502147 dated Jun. 12, 2019 (4 Pages).
Written Opinion for PCT/NO2019/0502147 dated Jun. 12, 2019 (4 pages).
English translation of abstract to Norwegian patent No. 20140844.

* cited by examiner

Open loop control

MODULARIZED SUBSEA SEAWATER DESALINATION SYSTEM

CROSS REFERENCE TO RELATED APPLICATION

This application is a 35 U.S.C. § 371 national stage application of PCT/NO2019/050217 filed Oct. 14, 2019 and entitled "Modularized subsea seawater desalination system," which claims priority to Norwegian Application No. 20181317 filed Oct. 12, 2018, each of which is incorporated herein by reference in their entirety for all purposes.

STATEMENT REGARDING FEDERALLY SPONSORED RESEARCH OR DEVELOPMENT

Not applicable.

FIELD OF DISCLOSURE

The present disclosure relates to a modular subsea desalination system. The system includes subsea templates with designated modules for desalination, pumping, control, chemical injection and fluid transport. The disclosure also relates to a subsea desalination module and a method exchanging such modules.

BACKGROUND OF THE DISCLOSURE

Prior art solutions include solutions with various types of arms or booms for holding a vessel to a quay. The arms are typically manually operated. Most of these solutions do however require the quay to be adapted to the vessel in one way or another. Other types include arms that form a part of the mooring after the mooring is completed.

Reverse osmosis (RO) membranes can be placed in seawater at a water depth providing to a hydrostatic pressure greater than the osmotic pressure (it). A hydrostatic pressure greater than it can be utilized in a desalination process to push water molecules through RO-membranes without requiring additional pressure. Subsea desalination is favourable as the pump providing the flow through the RO membranes can be located downstream of the RO membranes, thus only pumping the flow of desalinated water rather than the full flow of seawater.

SUMMARY OF THE DISCLOSURE

The present disclosure is based on the above-mentioned principle. The desalination system of the disclosure is adapted to be located at a designated water depth on the seabed. A circulation pump drives a flow of seawater through an array of RO-membranes. The retentate (concentrated seawater) from the RO-membranes is discharged locally. Permeate (desalinated water) is pumped with a transport pump to desalinated water receiving facilities. The transport pump generates a pressure difference. This decreases the inlet pressure of the pump, thus the permeate pressure of the RO membranes is equal to the inlet pressure of the transport pump. This provides the necessary differential pressure over the RO membranes to drive Reverse Osmosis. With this setup, seawater can be desalinated utilizing hydrostatic pressure present in the surrounding seawater.

High capacity desalination plants require a substantial land area, and such land areas are typically unavailable or expensive close to where desalinated water is required. It is thus also an advantage to locate desalination plants subsea.

Accordingly, the present disclosure relates to a subsea desalination system. The subsea desalination system includes a subsea desalination template adapted to be located on a seabed, including at least one subsea desalination module zone, at least one module fluid coupling and template piping in fluid connection with the least one module fluid coupling. At least one retrievable subsea desalination module is adapted to be placed in the at least one subsea desalination module zone of the subsea desalination template, and the at least one retrievable subsea desalination module including a subsea template fluid coupling is adapted to be connected to the at least one module fluid coupling. At least one reverse osmosis cartridge is in fluid connection with the subsea template fluid coupling. At least one seawater circulation pump assembly is in fluid connection with a seawater side of the at least one reverse osmosis cartridge. The circulation pump assembly may be both on the upstream side and the downstream side of the least one reverse osmosis cartridge. At least one desalinated water transport pump assembly is in fluid connection with a desalinated water side of the at least one reverse osmosis cartridge (23) in the retrievable subsea desalination module and at least one desalinated water pipeline. At least one retrievable subsea water pump module includes at least one of the desalinated water transport pump assembly, and the at least one seawater circulation pump assembly. At least one template fluid coupling on the at least one retrievable subsea water pump module is adapted to be connected to at least one module fluid coupling on a template with a pump module zone. The at least one desalinated water pipeline extends to a location above a sea level.

The subsea desalination system may further include a permanent seabed foundation secured to seabed anchoring elements, and the subsea desalination template may be adapted to be located on top of the permanent seabed foundation.

The subsea desalination template may be adapted to be located on a further base template in fluid connection with the desalinated water pipeline and a concentrated seawater outlet. The template includes template ducting and may include valves.

The further subsea base template may be adapted to be located on top of a permanent seabed foundation and may include template ducting and valves.

The subsea desalination template may further include seabed anchoring elements secured to the subsea desalination template.

The seabed anchoring elements may include suction anchors.

The template with a pump module zone may be the desalination template.

The at least one seawater circulation pump assembly and the at least one desalinated water transport pump assembly may be located in a common retrievable subsea water pump module.

The at least one seawater circulation pump assembly may be located in a retrievable seawater circulation pump module. The at least one desalinated water transport pump assembly may be located in a retrievable subsea desalinated water transport pump module. The retrievable transport pump module is then located in a desalinated water transport pump module zone and the retrievable subsea circulation pump module is located in a circulation pump module zone.

At least one retrievable control module is located in at least one control module zone on the desalination template.

The at least one subsea desalination module may further include a seawater inlet filter arranged to filter seawater entering the at least one reverse osmosis cartridge.

The seawater inlet filter may be located on top of the at least one subsea desalination module.

The template with a pump module zone may be a separate pumping template and a desalinated water flow path may then extend between the separate pumping template and the subsea desalination template.

The desalination system may further include a separate filtering and pumping station wherein a filter and the circulation pump assembly in a circulation pump module is located on the filtering and pumping station template upstream and in fluid connection with the desalination template, pumping seawater through the at least one subsea desalination module.

A separate pumping template with the at least one pumping module may be located on a downstream side of the subsea desalination template and includes a desalinated water inlet and a desalinated water outlet, whereby the separate pumping template with the at least one pumping module conveys water from the desalination template to a topside facility.

Furthermore, the disclosure concerns a subsea desalination module for a desalination system as described above comprises a plurality of reverse osmosis cartridges, a concentrated seawater outlet, a desalinated water outlet, a seawater intake and a subsea template fluid coupling adapted to be connected to at least one module fluid coupling on a desalination template.

Furthermore, the present disclosure relates to a method for replacing subsea modules installed on a subsea desalination system with serviced subsea modules. The method includes the steps of:
  identifying that the subsea module require service based on pre-defined parameters;
  providing a vessel above the subsea desalination system;
  lowering a subsea module lifting tool onto the selected subsea module;
  lifting the selected subsea module to the vessel;
  lowering the serviced subsea module onto subsea template;
  securing the serviced subsea module to the subsea template.

The identification may be based on parameters selected from the group of parameters: desalinated water flow rate, water pressure drop over the subsea desalination module, desalinated water salinity and regular time intervals.

securing the subsea desalination module lifting means to the used subsea desalination module, releasing the used subsea desalination module from a subsea desalination means, lifting the subsea desalination module lifting means and the used subsea desalination module on to the vessel, lowering the subsea desalination module lifting means and the serviced subsea desalination module onto subsea desalination template, securing the serviced subsea desalination module to the subsea desalination template, and releasing the subsea desalination module lifting means from the serviced subsea desalination module.

The lifting means can be a standard lifting frame, a releasing lifting tool, simple wires with eyelets etc.

The retrievability of the modules (and in some cases the templates) in the modular system provides a robust and reliable system.

The design enables parts of the system to be installed and retrieved at different intervention campaigns, in a series of operations or in one operation with all the modules in place.

This provides flexibility with respect to selection of installation vessels. Parts of the system may be isolated with valves and retrieved for maintenance while the rest of the system is in operation. With spare modules ready for operation on a service vessel, the retrieved module can immediately be replaced by another module. This provides increased availability (uptime). The maintenance and service work on modules can be done at other premises, such as on a supply base or elsewhere and provides flexibility with respect to the location of the maintenance work.

The modules with the same functions are standardized. The standardized modules can be swapped between any slot of the same type. Spare modules can be ready to be deployed to any slot location when replacement is needed. The modular design also provides the opportunity for stepwise expansion of the total production capacity of the desalination system during the lifetime of the subsea plant.

Lifting connectors mounted on the module frames, a guiding system, the module zones on the template or templates, use of an installation or service vessel, etc. provide a quick, robust and reliable means to install and retrieve modules (and in some cases templates and/or base templates). The intervention can be done at specific intervals or is triggered by events based on monitored parameters.

DETAILED DESCRIPTION OF THE DISCLOSED EXEMPLARY EMBODIMENTS

The exemplary embodiments disclosed herein are described with reference to the enclosed drawings.

Figure 1:
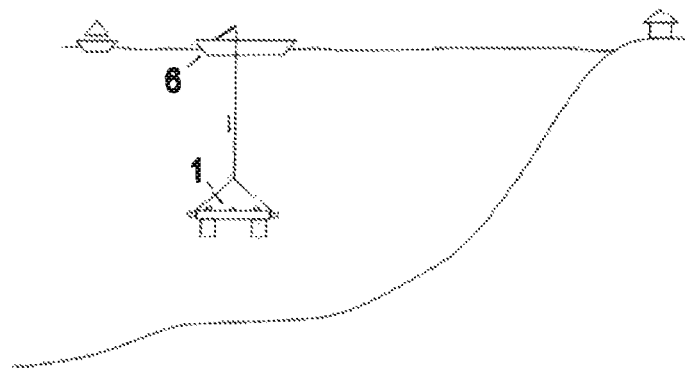
FIG. 1 is a schematic representation of a first step of an installation on a seabed of a part of a disclosed subsea desalination system.
Figure 2:
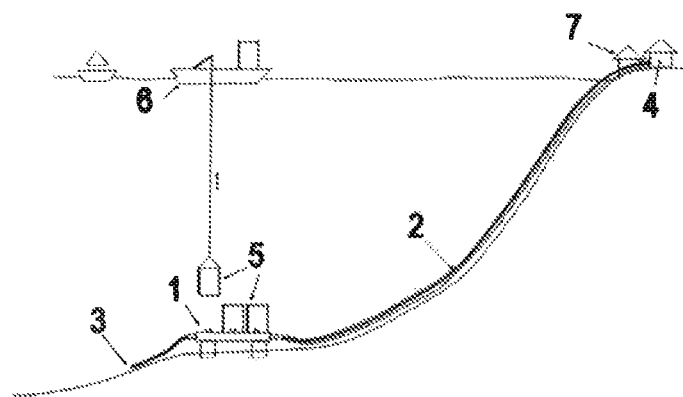
FIG. 2 is a schematic representation of a second step of the installation initiated in FIG. 1.
Figure 4:
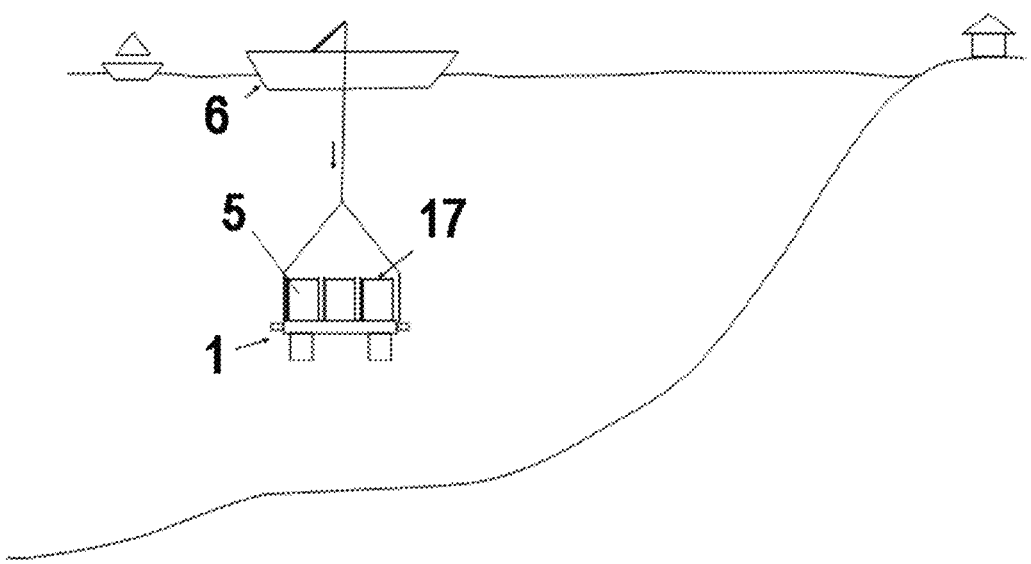
FIG. 4 is a schematic representation of a first step of an installation of a complete subsea desalination system.

The installation sequences shown in the FIGS. 1, 2, 4 are relevant for the installation of all templates and modules.

FIG. 1 shows a first installation step of a subsea desalination template 1. The subsea desalination template 1 is lowered from an installation/service vessel 6 towards a seabed.

The subsea desalination template 1 is prefabricated and is installed at a designated water depth. The template is installed as a one-time event landing it on its location using the installation/service vessel 6. The template is designed to support the total weight of a system including installation and operational tools and equipment. The template may contain internal piping or ducts, cables, valves and connections for water, power, data and chemicals. Alternatively, the template is landed on a permanent seabed foundation or base (not shown in FIG. 1) and the seabed foundation then represents the structure installed as the one-time event on its location using the installation vessel 6.

The subsea desalination template 1 or the seabed foundation is adapted to be located on the seabed and this may involve designing the subsea desalination template/foundation as a permanent base structure located at the seabed with installation slots or zones for modules and serves as a landing and operating base for modules (including desalination modules, pump modules, inlet modules, chemical modules, instrumentation and control modules). Alternatively, the template may be adapted to be located on the seabed by adapting it to be located on a separate permanent base structure installed on the seabed ahead of the template. The subsea desalination template 1 (or the seabed foundation) is fixed to the seabed with suction anchors. Other fixing mechanisms (not shown) may include mud mats, wires, concrete dumps, loads or pillars. A subsea desalination template 1 is usually installed in place permanently or for a long period such as the operation time or life time of the desalination system. The subsea desalination template 1 in FIG. 1 is shown installed without the modules.

Alternatively, the subsea desalination template 1 may be located on top of the seabed foundation installed ahead of the subsea desalination template on the seabed.

The subsea desalination template 1 may be retrieved from the seabed by the service vessel 6. The structure and foundation depend on the actual seabed conditions and requirements.

When the various subsea elements are installed and fixed at the seabed, a transportation pipeline for desalinated water, power and data cables for pumps and subsea equipment and chemical/supply lines may be installed and connected to the template/s.

The subsea desalination template 1 may be installed at the seabed with a pipeline and cables (already) connected to it.

FIG. 2 shows the subsea desalination template 1 of FIG. 1 installed on a seabed. The subsea desalination template 1 includes suction anchors or other suitable elements forming a foundation for the template. Standardized modules including desalination modules 5 are lowered from the service vessel 6 (installation vessel) and onto the subsea desalination template 1. The stepwise installation eases the requirements of the service vessel 6. The installation also includes installing a connection line including a power line and a desalinated water pipeline 2 from the subsea desalination template 1 to a land based desalinated water receiving facility 4. A line for cleaning chemicals may also run from the desalinated water receiving facility and to the subsea desalination template 1 along with the connection line including the power line and the desalinated water pipeline 2. The desalinated water receiving facility 4 may include a post treatment and bottling facility if the desalination system shall produce drinking water. Minerals and other additives may also be used to provide a more palatable water. The desalinated water receiving facility 4 can include a pumping station. The system may also include a supply base 7 for offshore operations and for transporting the desalinated water to another location. The desalinated water may be used for other purposes such as agriculture or industrial applications. A concentrated seawater outlet 3 with a tubular or any sort of duct or channel from the template leads the concentrated seawater away from the desalination system to prevent an increase of salinity around the desalination system.

The desalinated water receiving facility 4 also provides power and two-way data communication to the template. The data communication may include signals relating to the status of the various components of the subsea desalination template 1, and signals relating to operating parameters of the subsea desalination template 1.

The modules include at least one desalination module 5 with a plurality of RO-filter cartridges and one pumping module with a circulation pump for continuous feeding of seawater to the RO-filter cartridges and a transportation pump pumping desalinated water to the desalinated water receiving facility 4. The modules including the desalination module 5 stab into the subsea desalination template 1 with stab-in connections e.g. well known from subsea hydrocarbon production facilities. The stab-in connections may connect the desalination module 5 to the subsea desalination template 1 upon landing of the desalination module 5 in a desalination module zone on the subsea desalination template 1.

Alternatively, these connections may be substituted with connections connected using an ROV (Remotely Operated Vehicle). For the desalination modules with RO-filter cartridges, the connections typically include a connection for seawater, a connection for desalinated water, a connection for concentrated seawater and connections for transferring signals relating to the status of the module. Connections for cleaning chemicals may also be included.

An ROV is typically used to facilitate the installation and the connection of the modules onto the subsea desalination template 1.

A concentrated seawater outlet 3 with an extended discharge pipeline is installed in conjunction with the subsea desalination templates 1 to lead the concentrated seawater away from the desalination system. The desalination modules 5 and pump, control and chemical modules are installed on the subsea desalination template 1 at the seabed using e.g. the service vessel 6. The service vessel 6 has a crane with required lifting capacity to reach the subsea desalination template 1 on the seabed. It is advantageous if the service vessel has capacity to carry several modules in one campaign.

Power to the subsea desalination system is supplied either from shore via subsea power cable/s or by local marine power generation e.g. fuel, wind, solar or wave power. Power and instrumentation cables may be built into the connection line as one cable bundle or laid together. The subsea desalination template 1 may be located on a stand on the foundation to localize the template a certain distance above the seabed to prevent mud and debris from the seabed from being entrained in the water flow to the desalination modules.

Figure 3:
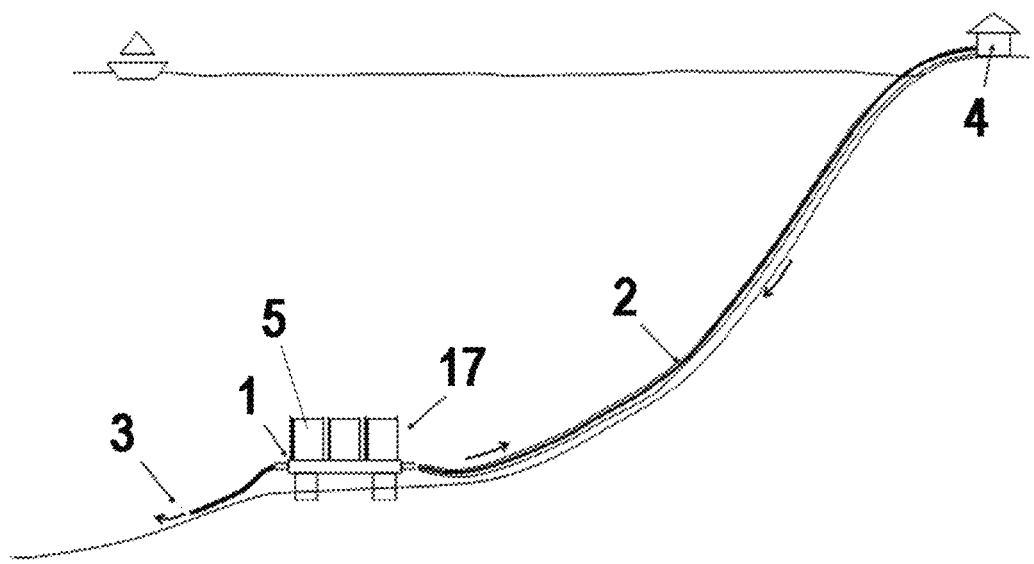
FIG. 3 is a schematic representation of an installed subsea desalination system.

FIG. 3 shows a subsea desalination system with the subsea desalination template 1, and desalination modules 5 and other modules installed on the seabed. A pump in a transport pump module 17*a* pumps desalinated water represented by an arrow pointing towards the right along the connection line including the desalinated water pipeline 2 in the form of water transportation lines to a desalinated water receiving facility 4. An arrow pointing towards the left along the connection lines represent electric power to the pumps in the transport pump modules 17*a*. Concentrated seawater is expelled through the concentrated seawater tubular with the concentrated seawater outlet 3.

FIG. 4 shows an alternative installation method including installing a complete subsea desalination system with the subsea desalination template 1 and modules including the desalination modules 5 from a service vessel 6 in a single operation. The installation method will for instance depend on the allowable load rating of the service vessel 6. A pump module 17 may include both a transport pump for desalinated water and a circulation pump for pumping seawater through the desalination modules.

Figure 5:
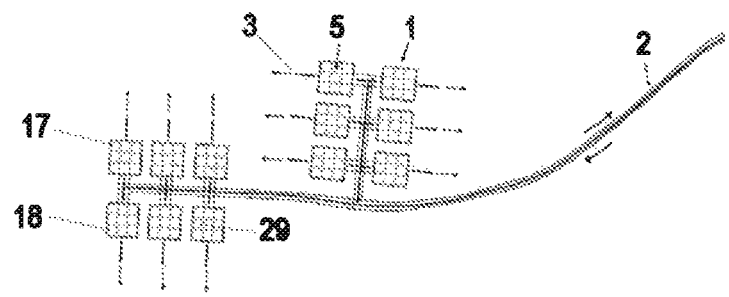
FIG. 5 is a schematic representation of a subsea desalination system with twelve desalination system templates.

FIG. 5 shows a subsea desalination plant with twelve desalination templates 1 as seen from above. Each desalination template 1 includes nine modules whereof six desalination modules 5, a pump module 17, a retrievable control module 18 and a retrievable chemical injection module 29. The desalination templates 1 are connected to desalinated water branch pipes feeding into a forming a common desalinated water line 2 conveying desalinated water to a desalinated water receiving facility. Each desalination module 5 is also connected to power supply cables and control cables. Discharge tubulars with the concentrated seawater outlet 3 discharge concentrated seawater. Each square represents a module. FIG. 5 illustrates that the plant is easily scalable to and adaptable to different applications. The pump module 17 include both the transport pump for desalinated water and the circulation pump for pumping seawater through the desalination modules The control module 18 includes the electronic and logic circuits to monitor and control the desalination system, communicate with a topside control room and execute commands. The control module 18 includes electrical connectors connecting the control cable/s for I/O (Input/Output) to the surface and connectors for I/O to sensors and equipment on the template. Each control function, e.g. open and close a valve, will have a dedicated control loop.

This could be a simple open loop control, or a more advanced closed loop control with sensor feedback.

Figure 5B:
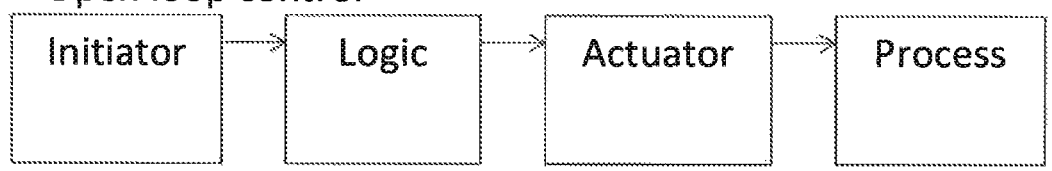
FIG. 5b is a subsea desalination control flow chart.

The subsea desalination control flow chart FIG. 5*b* shows how an open loop control can be set up.

Control functions are usually initiated from the topside control room by a human operator but can alternatively be fully automated and executed by the control system. The control module 18 houses all electronics in one atmosphere pressure vessels, designed to withstand the hydrostatic pressure at the installation depth.

Control modules 18 are retrievable, interchangeable and replaceable.

Chemicals for cleaning can be supplied through the chemical line 12 extending from a chemical reservoir on land or on the service vessel.

In some cases, local chemical supply could be an advantage or necessary. In these cases, a chemical injection module 29 contains one or several chemical containers and required pumps, piping/ducting, instrumentations and control systems for cleaning, maintenance and disinfection purposes. Chemicals are injected into, and mixed with the desalinated water flow for cleaning, maintenance and disinfection purposes. Different types of chemicals are used in "clean-in-place solution" to backflush desalination modules with RO-cartridges or pre-filter assemblies. The chemical injection modules 29 are retrievable, interchangeable and replaceable.

The control functions may be integrated in at least one module to omit a separate control module.

Figure 6:
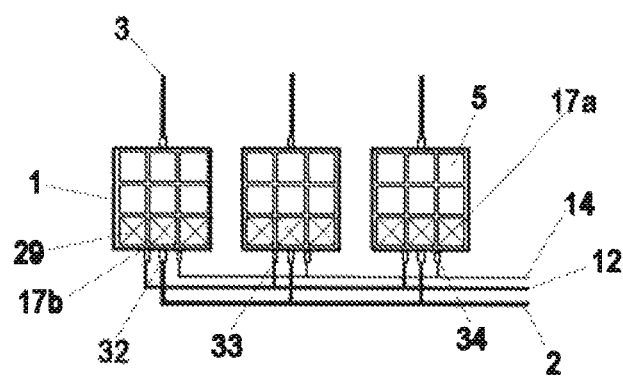
FIG. 6 shows a detail of FIG. 5 with three templates.

FIG. 6 largely corresponds to a detail of FIG. 5 with three desalination templates 1 each including a desalinated water line coupling 32 connecting the desalinated water pipeline 2, a power line coupling 34 connecting a power line 14, a chemical line coupling 33 connecting a chemical line 12, and a concentrated seawater outlet 3 with a discharge line. In FIG. 6 however there is a separate retrievable transport pump module 17*a* and a separate retrievable seawater circulation pump module 17*b*. The chemical injection module 29 is provided for cleaning the desalination system. The six open squares represent desalination modules 5. A control system may include sensors monitoring pressures, volumetric flows, salinity, power consumption, temperatures etc.

Figure 6B:
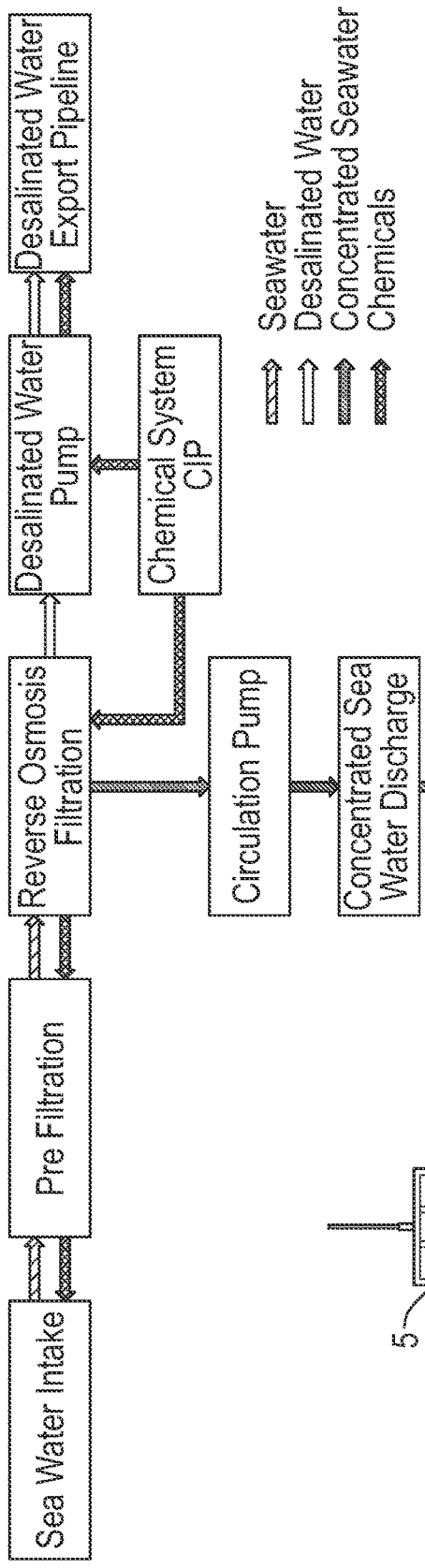
FIG. 6b is a subsea desalination flow chart.

The subsea desalination flow chart FIG. 6*b* shows how the water flows through the various elements of the desalination system in a specific embodiment with a circulation pump downstream of the desalination filter/the reverse osmosis filtration.

The retrievable transport pump module 17*a* with a transport pump is powered by electricity supplied from the receiving facility. In an alternative embodiment, FIG. 5, a pump module 17 includes both the transport pump transporting desalinated water to the surface and the circulation pump producing a flow of seawater past the RO-filters. The stab-in connections include connections for the desalinated water pump, pump power and signalling. Transport pump module 17*a* pushes the desalinated water to the receiving surface facilities. The transport pump makes sure that there is no or very little back pressure on the RO-filter cartridges by evacuating the desalinated water downstream of the desalination modules. The transport pump in the transport pump module 17*a* provides a pressure difference over the RO-filters that is greater than the osmotic pressure.

The transport pump module 17*a* includes a submergible electric motor and a pump connected by a drive shaft/ coupling. The pump provides the necessary head in the desalinated water. Power to the electric motor may be provided by electric jumpers from a power cable termination (not shown) instead of the stab in connections. Such jumpers can be connected and disconnected by an ROV.

The pump includes a housing with the hydraulic machine that provides the specified head and flow rate in the fluid. The pump is connected to the template piping/ducting with a fluid inlet and a fluid outlet.

The transport pump module 17a contain ancillary systems and devices to ensure reliable operation of the pump and motor, e.g. motor cooling system, lubrication system, valves and instrumentation for monitoring and control. Pump modules 17 are retrievable, interchangeable and replaceable. The pump module is located downstream of the desalination modules 5.

In an alternative embodiment, the circulation pump for seawater is placed up-stream of the desalination modules or upstream of the desalination module.

Figure 7:
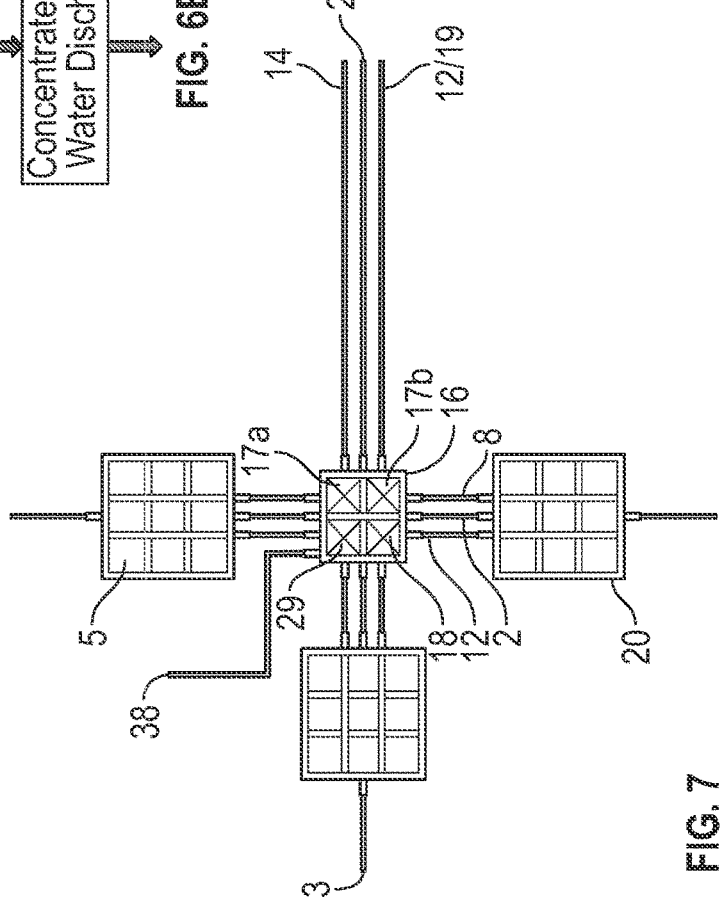
FIG. 7 is schematic representation of an alternative configuration of a desalination system with a separate pumping template.

FIG. 7 shows an alternative configuration of a desalination system with a separate pumping template 16 serving several desalination templates 20 without pumps or control modules. The pumping template 16 includes a retrievable chemical injection module 29, a retrievable transport desalinated water pumping module 17a, a retrievable seawater circulation pump module 17b and a retrievable control module 18. The retrievable seawater circulation pump module 17b and the transport pump module 17a are shown in separate retrievable circulation pump modules but could have been located in the same module as shown in FIG. 5. In the latter case can the pumping template with four zones accommodate two pumping modules 17 each with both a seawater circulation pump and a transport pump to provide a failsafe system with built in redundancy allowing components to be exchanged without stopping production. The desalination templates 20 only include desalination modules 5. Concentrated seawater outlet 3 with discharge tubulars lead concentrated seawater away from the system as explained above. The line for electric power 14, the control cable 19 and the connection line with the desalinated water pipeline 2 runs to the desalinated water receiving facility on a service vessel or a topside facility. The pumping template 16 provides a flow path between the seawater entrance 38 and the seawater circulation pump 11. The inlet tubular 8 provides the flow path for seawater from the separate pumping template 16 and to the desalination templates 20. Seawater is pumped from the seawater inlet 9, through the pumping template 16, through the seawater circulation pump 11, through the pumping template 16, through the inlet tubular 8, through the desalination template 20, through the seawater filter in the desalination module 5, past and partly through the RO-cartridges to be separated into concentrated seawater and desalinated water, whereby the concentrated seawater flows through the template and out of the concentrated seawater outlet 3. The desalinated water flows into the desalination template 20, the connection line with the desalinated water pipeline 2, through the pump template 16, through the transport pump module 17a, through the pump template 16, through the desalinated water pipeline 2 and to the desalinated water receiving facility (not shown in FIG. 7).

The chemical injection module 29 includes a tank or several tanks with chemicals to be injected into the desalination modules 5, in particular on the seawater side of the cartridges to remove fouling, scaling etc. that reduces or prevents flow of water through the cartridges. Chemicals such as citric acid can also be injected into the desalinated side of the cartridges to flush the cartridges in a reversed flow direction.

In FIG. 7, the separate pumping template 16 serve three desalination templates 20 without pumps or control modules, but a higher or lower number of desalination templates may clearly be served.

Figure 8:
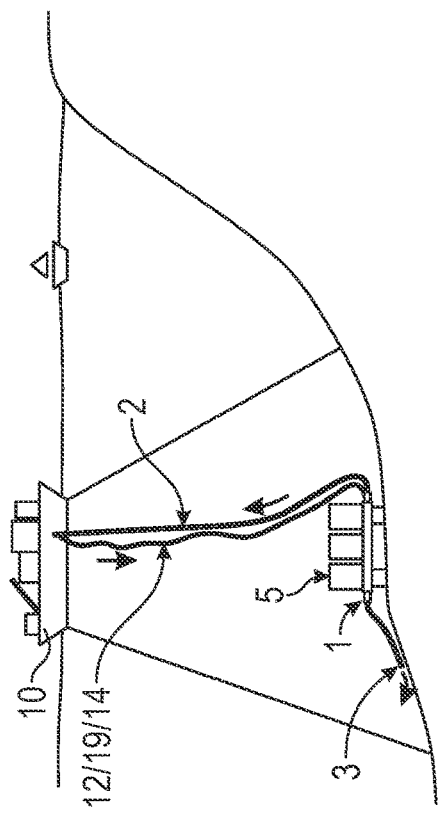
FIG. 8 is schematic representation of a desalination system in an alternative embodiment with a floating desalinated water receiving facility.

FIG. 8 shows the desalination system in an alternative embodiment with a floating desalinated water receiving facility 10. Desalinated water is pumped to the floating desalinated water receiving facility 10 through the desalinated water pipeline 2. Chemical line 12, power cable 14 and control cable 19 convey the required consumables to the desalination template 1 with the desalination modules 5. The concentrated seawater outlet 3 with the discharge tubular leads the concentrated seawater a distance away from the desalination template 1 and to a location where the concentrated seawater not will have a negative influence on the local marine life.

Figure 9:
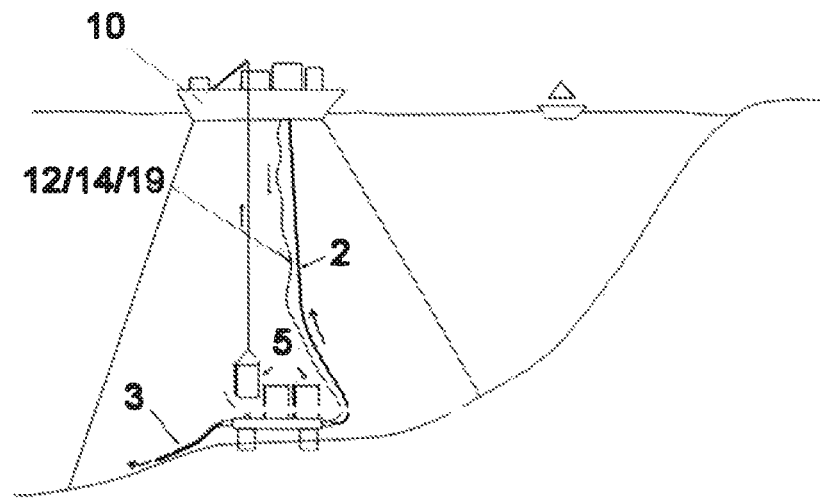
FIG. 9 shows the embodiment of FIG. 8 during a module exchange step.

FIG. 9 shows the embodiment of FIG. 8 and highlights that a floating desalinated water receiving facility 10 also can be used to exchange the modules such as the desalination modules 5 for service and maintenance. Cleaning chemicals are conveyed through the chemical line 12. The concentrated seawater is led out of the concentrated seawater outlet 3 away from the template with the discharge tubular.

Figure 10:
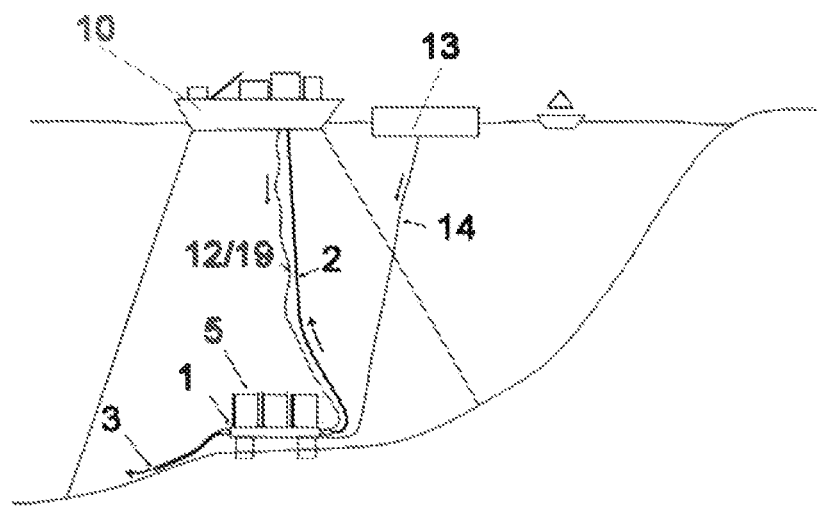
FIG. 10 shows the embodiment of FIG. 8 further including a floating power generation unit.

FIG. 10 shows the embodiment of FIGS. 8 and 9, apart from also showing a separate floating power generation unit 13. The power generation unit 13 can include systems providing renewable energy from waves, the wind, the sun, tidal currents etc. Alternatively, the power generation unit 13 can include a combustion engine and a generator. The power line extends from the floating power generation unit 13 and to the desalination system at the seabed.

Figure 11:
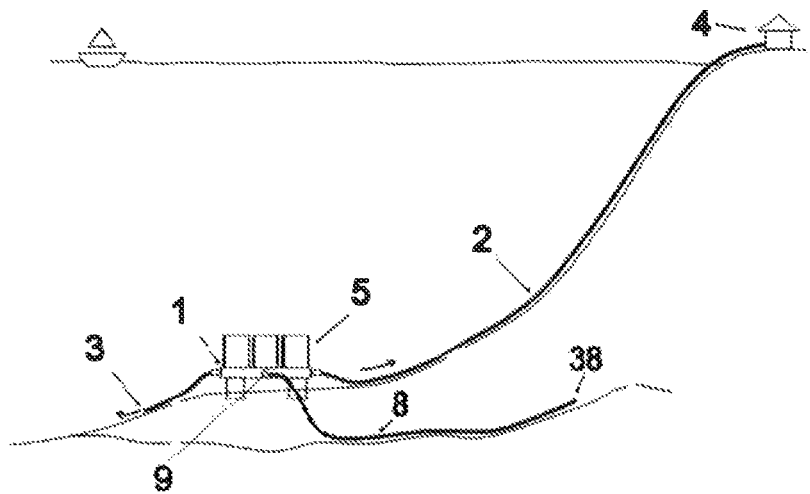
FIG. 11 shows an alternative embodiment with a seawater inlet at a remote location relative to a template.

FIG. 11 shows an alternative embodiment with the seawater inlet of the desalination template 1 connected to an inlet tubular 8 with a seawater entrance 38 at a remote location relative to the subsea desalination template 1. The inlet tubular 8 connected to the seawater inlet 9 on the subsea desalination template 1 may be used to provide seawater with a more favourable quality to the desalination modules 5, including lower concentration of pollution, biological material, salt, or other unwanted substances. The concentrated seawater outlet 3 is located away from the seawater entrance 38 to prevent concentrated seawater from entering the seawater entrance 38. The shore based desalinated water receiving facility 4 connected to the desalination template 1 through the desalinated water pipeline 2 requires a small footprint comparted to a complete desalination plant.

Figure 12:
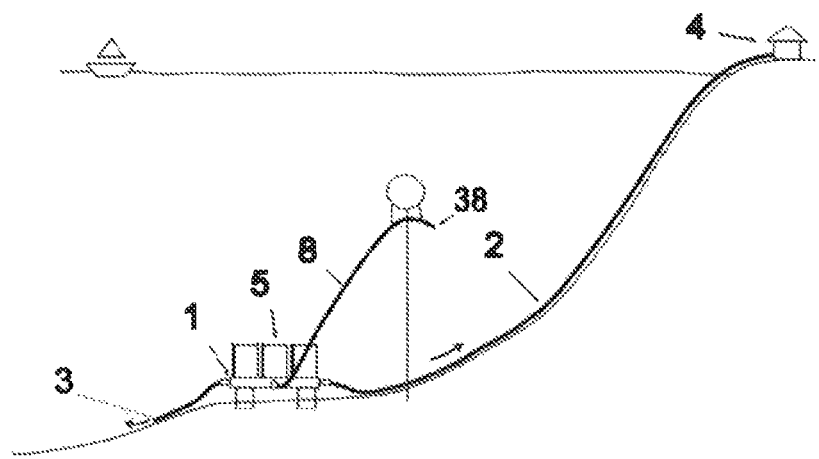
FIG. 12 shows an alternative embodiment with a seawater inlet at a remote location above a template.

FIG. 12 shows an alternative embodiment corresponding to the embodiment of FIG. 11, but where the inlet tubular 8 with a seawater entrance 38 is elevated from the seabed and the inlet tubular 8 is secured to a floating buoy moored to the seabed.

Figure 13:
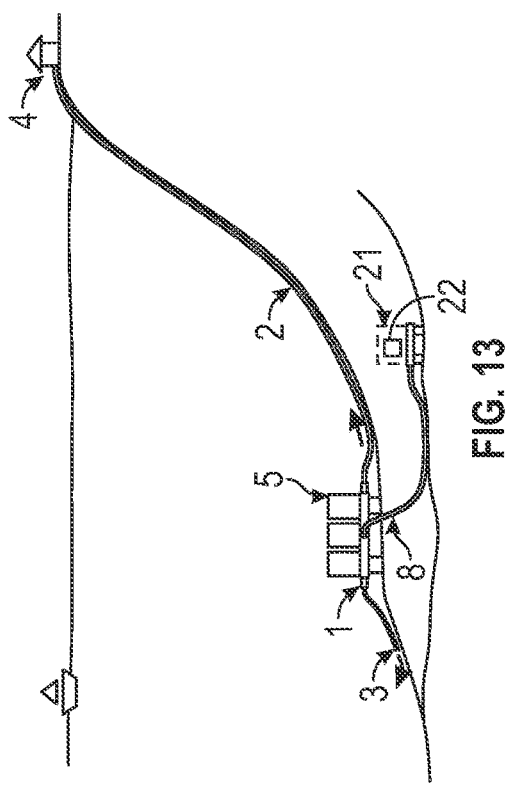
FIG. 13 shows an alternative embodiment with a seawater inlet at a separate filtering and pumping station.

FIG. 13 shows an alternative embodiment corresponding to the embodiment of FIGS. 11 and 12, but where the inlet tubular 8 is connected to a separate filtering and pumping station 21 with a separate seawater entrance. The filtering and pumping station 21 includes one or several modules in a separate filtering and pumping template with one or several inlet filters 22 and an upstream seawater pump, feeding seawater through the desalination modules from the inlet side. The filtering and pumping station 21 provides an inlet unit with a seawater entrance on a separate structure or template away from the subsea desalination template 1. Seawater flows through the filtering and pumping station 21 for pre-filtration or pre-treatment before it enters the desalination modules. The filtering and pumping station 21 contains one or more inlet modules (not shown). Each inlet module contains filter assemblies for filtration and pre-treatment of seawater. A filter assembly includes one or more filters with different properties. Inlet modules are retrievable, interchangeable and replaceable. The filtering and pumping station 21 also includes a feed pump. The feed pump operates as a circulation pump for the desalination system and enables discharge of concentrated seawater from the desalination system. The feed pump may be built into a retrievable and replaceable feed pump module.

Figure 13B:
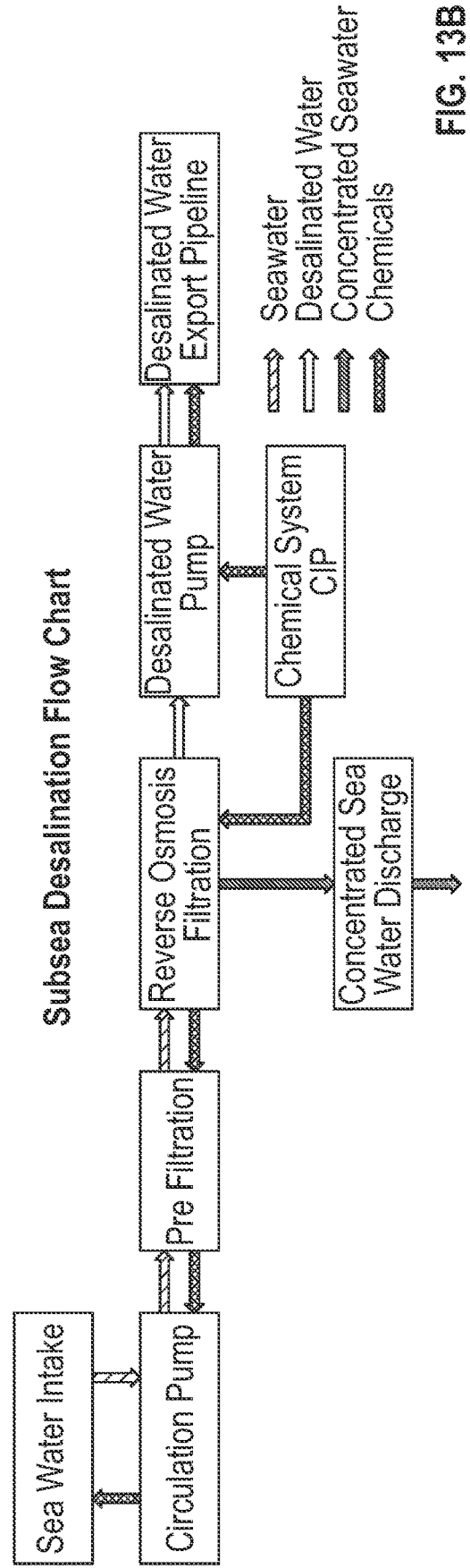
FIG. 13b is a subsea desalination flow chart.

The subsea desalination flow chart FIG. 13b shows how the water flows through the various elements of the desalination system in a specific embodiment with a seawater intake/entrance and a circulation pump upstream of the pre circulation filter and the desalination filter/the reverse osmosis filtration.

Figure 14:
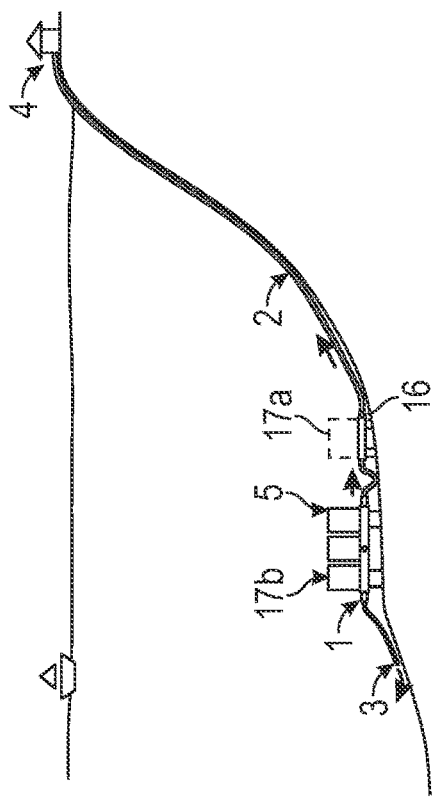
FIG. 14 shows an alternative embodiment with a desalinated water transport pump template separate from a water desalination template.

FIG. 14 shows the solution of FIG. 7 with a separate pump module template 16 with the transport pump module 17a for desalinated water located downstream of the desalination template 1 with the with concentrated seawater outlet 3 and the desalination modules 5, and upstream of the desalinated water receiving facility 4. The retrievable circulation pump module 17b is located on the desalination template 1.

Figures 15A, 15B, 15C, 15D:
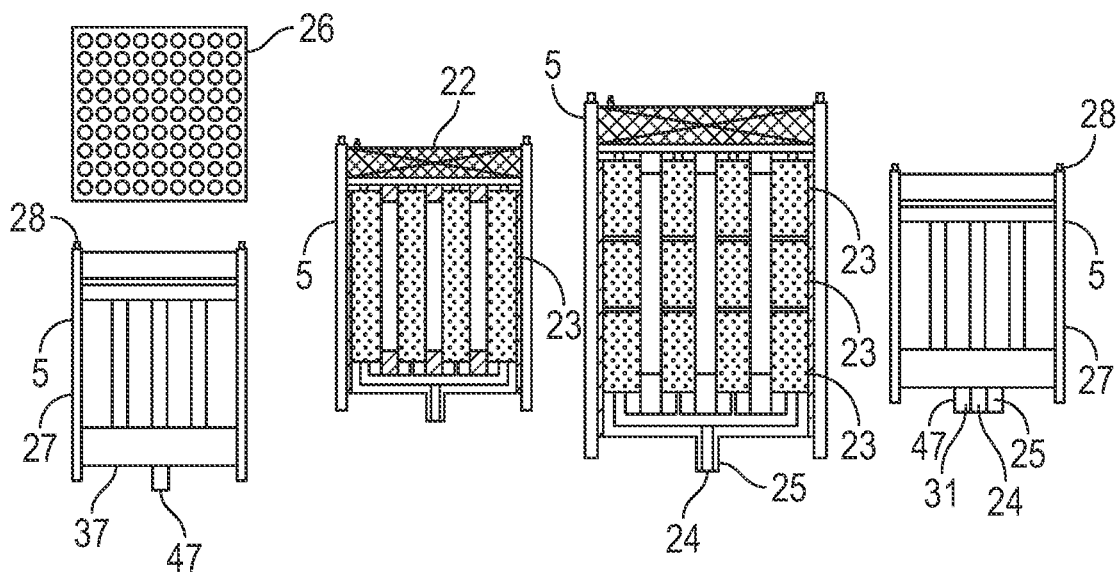
FIGS. 15a-15d show details of desalination modules for the desalination system.

FIG. 15a, 15b, 15c show details of a desalination module 5 for disclosed desalination systems. The desalination module 5 includes a plurality of RO-cartridges 23 located in an array inside the desalination module 5. FIG. 15b shows one cartridge extending the length of the module, and FIG. 15b shows three RO-cartridges 23 extending the length of the module. The number and size of the cartridges depends on the commercially available RO-cartridges and the design parameters of the module. Bespoke RO-cartridges may also be used. An inlet filter 22 for ambient seawater is located on top of the modules and an inlet grid 26 protects the inlet filter 22 for seawater. The inlet filter 22 is designed to prevent premature clogging of the RO-cartridges. The desalination module 5 includes an outer frame 27 and upper lifting connectors 28 commonly used for subsea modules. A desalinated water outlet 24 and a concentrated seawater outlet 25 are located at the bottom side 37 of the module and are adapted for connection with the template. These outlets may form the template coupling 47 that is designed to stab into the module coupling in the desalination template zone of the desalination template.

The desalination module 5 with the plurality of RO-filter cartridges 23 is includes an assembly of conduits arranged in parallel where one (FIG. 15b) or more (FIG. 15c) RO-filter cartridges 23 are connected to in each conduit in series. Seawater enters the desalination module through the prefilter assembly or inlet filter 22 where seawater is filtered to the desired quality. Then pre-filtered seawater is distributed over the RO assembly where it enters an assembly of the RO-filter cartridges 23 in the individual conduits. Inside the conduits, seawater is separated by the RO-filter cartridges 23 into the desalinated water part (permeate) and the concentrated seawater part (retentate). The desalinated water part and the concentrated seawater part, exits through separate outlets 24, 25 respectively and each part is collected in its own collection piping or manifold system. The desalination module 5 is connected to the template via flow connectors.

The desalinated water from the desalination modules 5 is collected and pumped to the surface by the transportation pump. The circulation pump makes sure that a enough seawater continuously enters the desalination modules 5, and that the concentrated seawater leaves the modules and is transported to a desired location where it is discharged to the sea.

The pre-filters or inlet filters 22 improving the water quality are placed upstream of the RO-filter cartridges 23. The pre-filters inlet filters 22 are formed as an assembly including one or more filter elements. The shape, size, material composition, number of layers and exact functionality of a pre-filter assembly depends on the local water conditions, operational requirements for RO-filter cartridges and required changing frequency of desalination modules. The pre-filter assembly is shown as an integrated part of the desalination module.

This is opposed to the embodiment shown in FIG. 13 where a separate pre-filter assembly form a part of a filter module located at a different location. As an alternative, the pre-filter assembly could be placed on the same template as the desalination modules, at a different structure, at a different template or as a separate unit on its own template.

FIG. 15d shows an embodiment of the desalination module 5 with a seawater intake 31 in the subsea template fluid coupling 47 to allow seawater from the circulation pump to be pumped into the desalination module. Accordingly does this embodiment not include the seawater intake at the top of the desalination module. This module is for instance suitable for the configuration shown in FIG. 13 where an external unit includes the circulation pump and inlet pre-filter, pumping the seawater at low pressure (below the osmotic pressure 7c) into the desalination template and from there into seawater intake 31 in the subsea template fluid coupling 47.

Figures 16A, 16B, 16C:
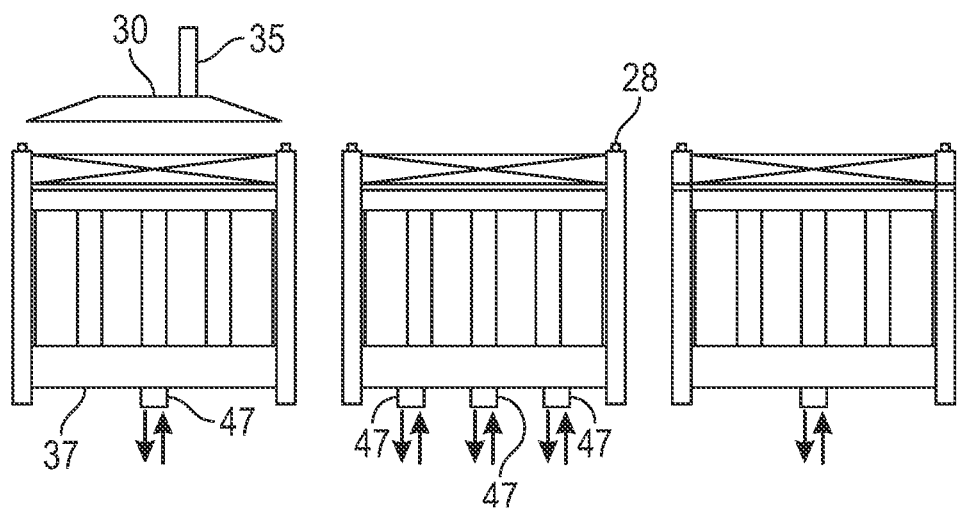
FIGS. 16a-16c show details of alternative desalination modules for the disclosed desalination system.

Similarly, does FIG. 16 also show a desalination module. FIG. 16 shows an embodiment with several outlets for desalinated water and concentrated seawater. FIG. 16a also show an embodiment with a top cap 30 allowing seawater to be pumped into the desalination module instead of pumping desalinated water out of the module. Standardized lifting connections 28 on top of the desalination module frame allows a standardized lifting frame to be connected to the desalination module for installation and retrieval purposes. The top cap 30 includes a seawater inlet connection 35 to allow filtered seawater into the top cap and into the RO-cartridges.

FIG. 16a shows one template coupling 47 and FIG. 16b shows three separate template couplings 47 adapted to be connected to the module couplings of the module zones of the templates at the bottom side 37 of the modules. The pump modules may have similar couplings.

The circulation pump can also be located upstream of the desalination module and the outlet of the circulation pump can be in fluid connection with the seawater inlet connection 35.

Figure 17:
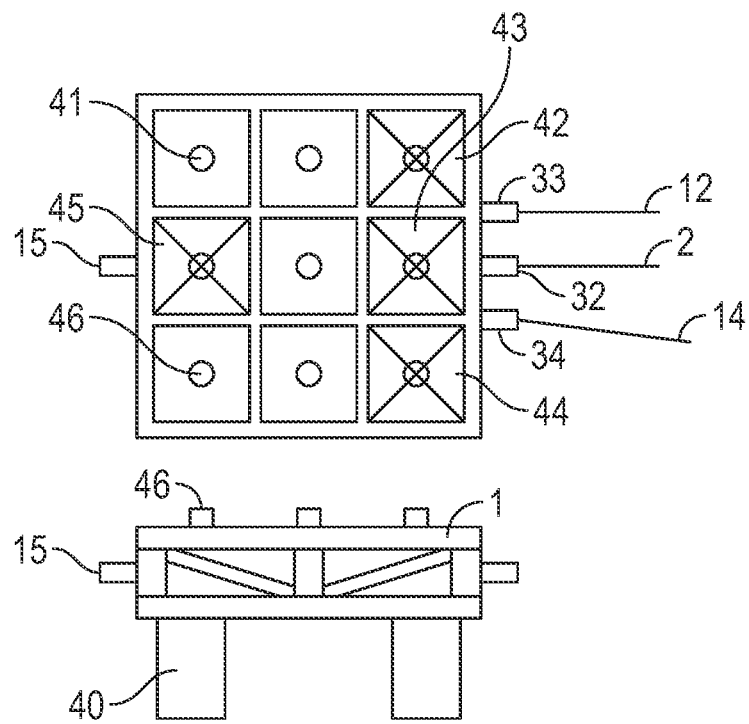
FIG. 17 is a schematic representation of a subsea template in a 3×3 configuration for 9 modules in an elevation and from the side.
Figure 18:
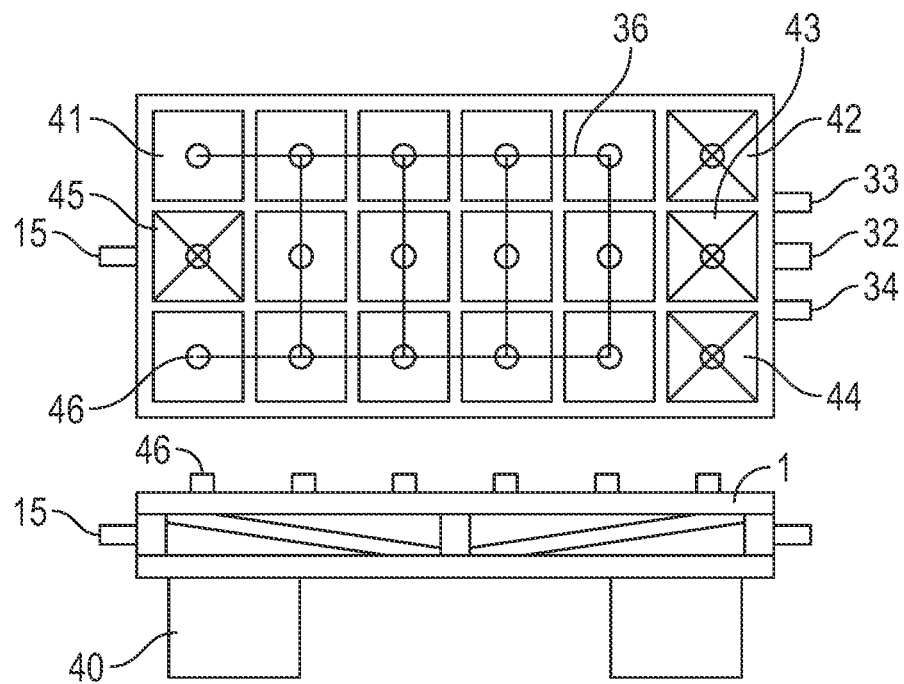
FIG. 18 is a schematic representation of a subsea template in a 3×6 configuration for 18 modules in an elevation and from the side.

FIGS. 17 and 18 show desalination templates 1 in a top elevation and from the side with room for nine and eighteen modules respectively. The templates include seabed anchoring elements 40 such as four suction anchors to secure the desalination templates 1 to the seabed. A concentrated seawater outlet coupling 32 is located at one end of the template and connects the desalinated water pipeline 2 to the desalination template 1. A power line coupling 34 connects power cable 14 and chemical line coupling 33 connects chemical line 12 to the template. The squares of the templates represent sockets or couplings for modules, allowing one module to be installed in each square. The crossed-out squares represent zones with sockets for technical functions and the squares without a cross represents desalination module zones 41. The sockets for technical modules may include a pump module zone 42, a chemical injection module zone 43 and a control module zone 44. Each zone includes at least one module fluid coupling 46 with connections for a module. The module fluid couplings 46 for at least the one or more pump module zones 42 and the one or more desalination module zones 41 include water connections. The one or more pump module zones 42 include module fluid (water) couplings 46 for power and control cables. The control module zone 44 may include connections for various sensor and may also include control hardware for controlling the electric motor in the pump module. The control module also controls valves inside the template (not shown) enabling complete cut-off of a module connection to allow exchange of modules without seawater leaking into the desalinated water system. The control module also controls valves allowing cleaning fluids into the components, and valves to allow back flushing of the desalination modules to prevent clogging. The control module can also monitor pressure sensors and flow sensors to identify when a desalination module should be flushed or exchanged and communicate with salinity sensors to identify unwanted ingress of seawater into the desalinated water circuits.

The modules can be «cleaned in place» while located on the seabed. A cleaning fluid is pumped into the modules through the template, either from a cleaning module or from a separate cleaning fluid line from the surface. A module can be singled out and cleaned while other modules are in operation.

In addition to what is shown in FIG. 17 does FIG. 18 show a socket for a circulation pump module. The circulation pump module may pump water out of the concentrated seawater outlet 3 and thus force seawater to flow past the RO-filters in the desalination modules. Alternatively, the circulation pump module could be located upstream of the RO-filters in the desalination modules. Template piping or ducting with valves 36 is schematically indicated in the desalination template, acknowledging that all the templates in the figures include some sort of template piping or ducting with valves 36 to accommodate for different modes of operation and flow situations including exchange of modules, flushing with chemicals, bypassing non-functioning modules, etc. The template piping with valves is 36 integrated in the template or extend partly or fully on the outside of the template and the schematic representation is not complete and is not intended to represent an actual template piping with valves.

Figure 19C:
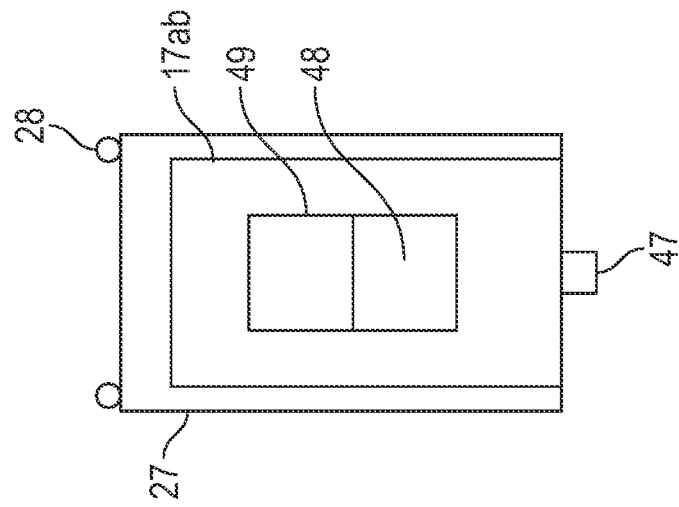
FIG. 19a-c are schematic representations of water pump modules of the disclosure.
Figure 19B:
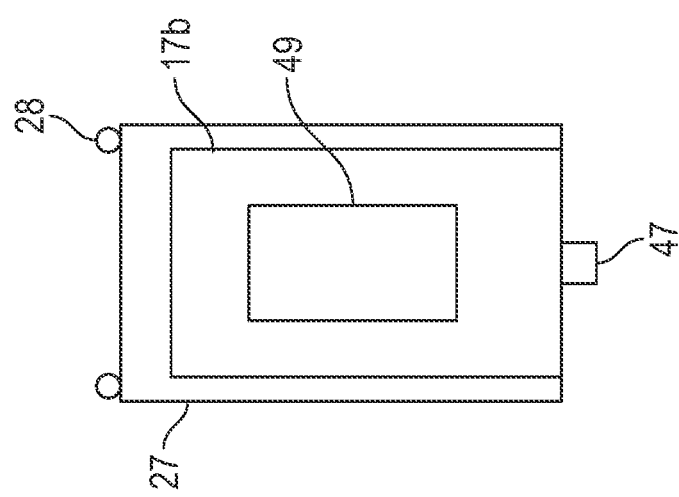
Figure 19A:
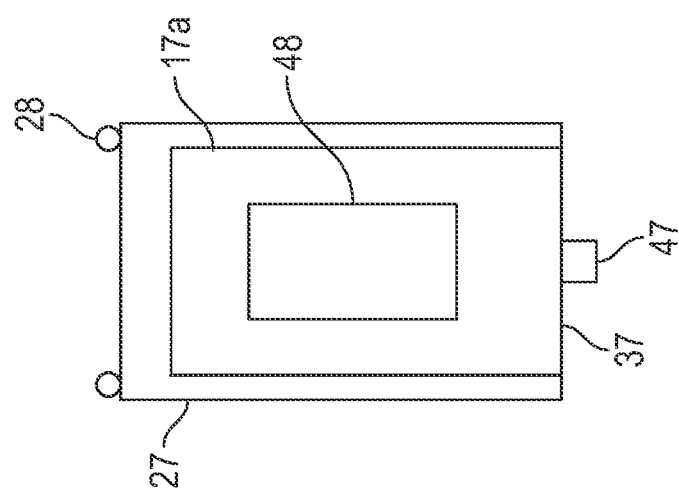

FIG. 19*a-c* shows a water pump module 17 with a module frame 27, and a sealed, electric water pump assembly including a pump and a motor. Standardized lifting connections 28 are secured to the module frame 27. The subsea template coupling 47, provides a fluid coupling and includes at least one of a water inlet and a water outlet. The subsea template coupling 47 may further include a control connection and a power connection. The connections are typically located at a bottom side 37 of the water pump module 17. The connections are adapted to the template and may form the interface between the module zone of the template and the pump module 17. The water pump module may be a desalinated water transport pump module 17*a* with a desalinated water transport pump assembly 48 as shown in FIG. 19*a*, a seawater circulation pump module 17*b* with a seawater circulation pump assembly 49 as shown in FIG. 19*b* or a combined desalinated water transport pump and seawater circulation pump module 17*ab* as shown in FIG. 19*c*. In the latter case, the water pump module includes both the desalinated water transport pump assembly 48 and the seawater circulation pump assembly 49.

Figure 20:
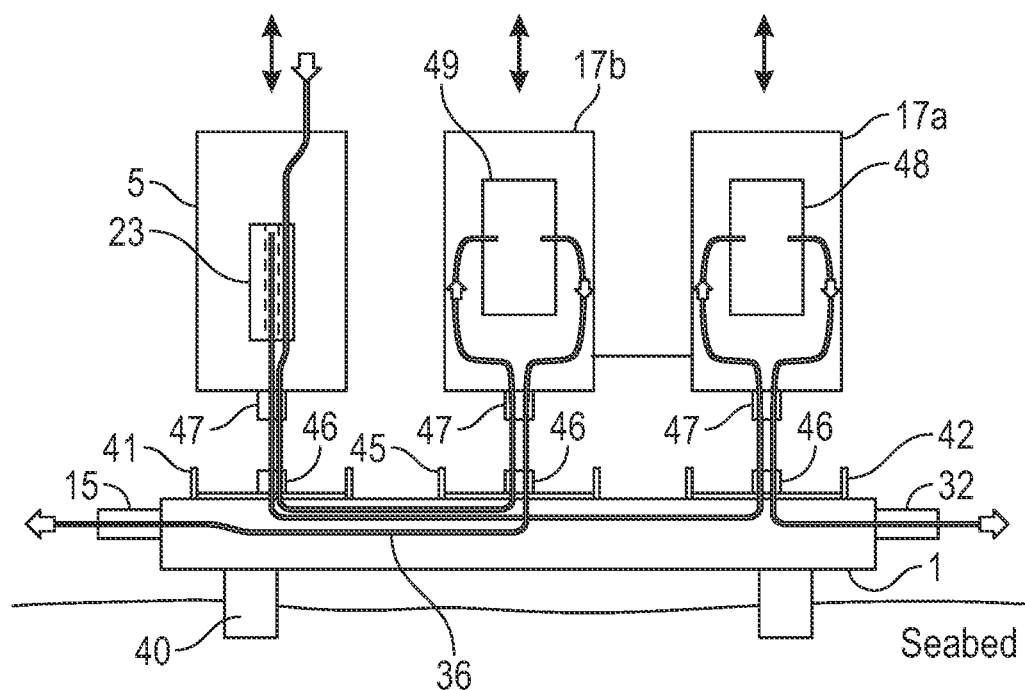
FIG. 20 is a schematic representation of a flow between a template, a desalination module, a circulation module and a transport module.

FIG. 20 is a schematic representation of a disclosed modularized subsea seawater desalination system, the figure indicating the flow of water. The inlet for seawater is indicated with an arrow pointing downwards above the desalination module 5 with the RO-cartridge 23. The concentrated seawater from the desalination module 5 flows through the subsea template fluid coupling 47 connected to the module fluid coupling 46 in the subsea desalination module zone 41, through the desalination template 1, through the subsea circulation pump module 17*b* with a circulation pump assembly 49 and leaves the desalination template 1 through the concentrated seawater outlet coupling 15, as indicated by arrow pointing to the left.

The desalinated water from the desalination module 5 flows through the subsea template fluid coupling 47 connected to the module fluid coupling 46 in the subsea desalination module zone 41, through the desalination template 1, subsea transport pump module 17*a* with a transport pump assembly 48 and leaves the desalination template 1 desalinated water line coupling 32, as indicated by arrow pointing to the right.

The desalination module 5, the circulation pump module 17*b* and the transport pump module 17*a* are to be installed in their respective module zones 41, 45, 42 on the desalination template. Each zone includes a module fluid coupling 46 and each module includes a template fluid coupling 47.

The desalination template 1 includes seabed anchoring elements 40 such as suction anchors, piles etc.

Figure 21:
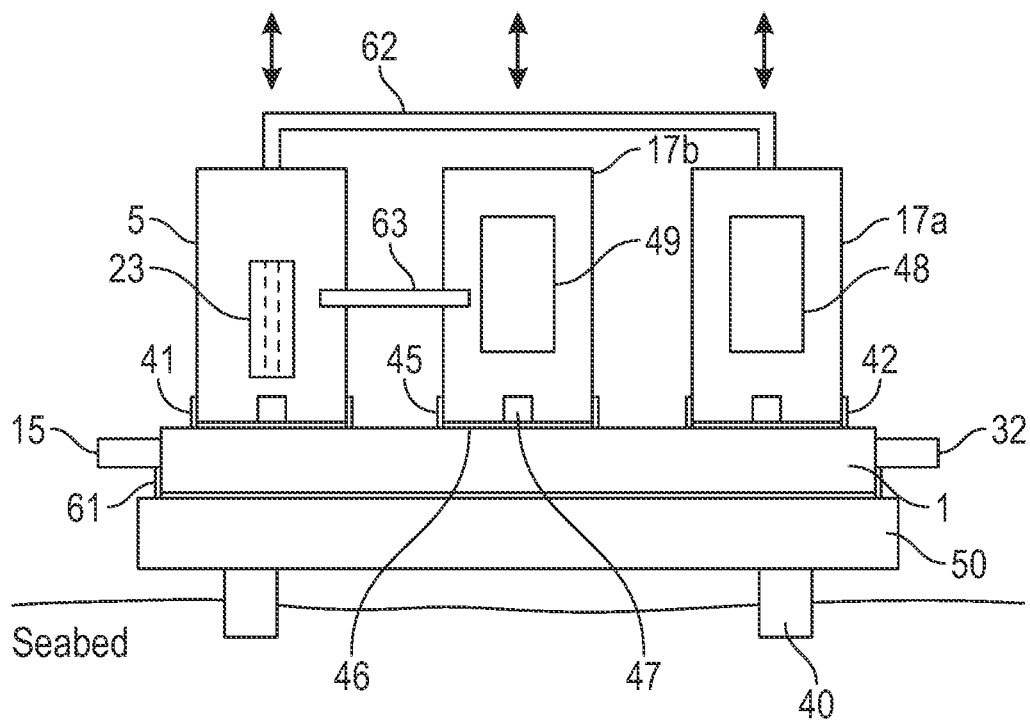
FIG. 21 is a schematic representation of a subsea desalination system with template on permanent seabed foundation and jumpers between modules.

FIG. 21 shows an alternative embodiment where the desalination template 1 is retrievable and is located on a permanent seabed foundation 50 secured to seabed anchoring elements 40. The permanent seabed foundation 50 does not include any piping or other features requiring maintenance and service. A template holding frame 61 on the permanent seabed foundation 50 localizes the desalination template 1 on the permanent seabed foundation 50. The retrievable desalination template 1 is allowed be retrieved for service and repair while the permanent seabed foundation 50 ensures that the desalination template 1 maintains its position after deployment.

Jumpers 62 and 63 connect the desalination module 5 in the desalination module zone 41, the circulation pump module 17*b* with circulation pump assembly 49 in the circulation pump module zone 45 and the transport pump module 17*a* with transport pump assembly 48 in the transport pump module zone 42 to indicate that not all the connections need to be made up with the desalination template 1.

Figure 22:
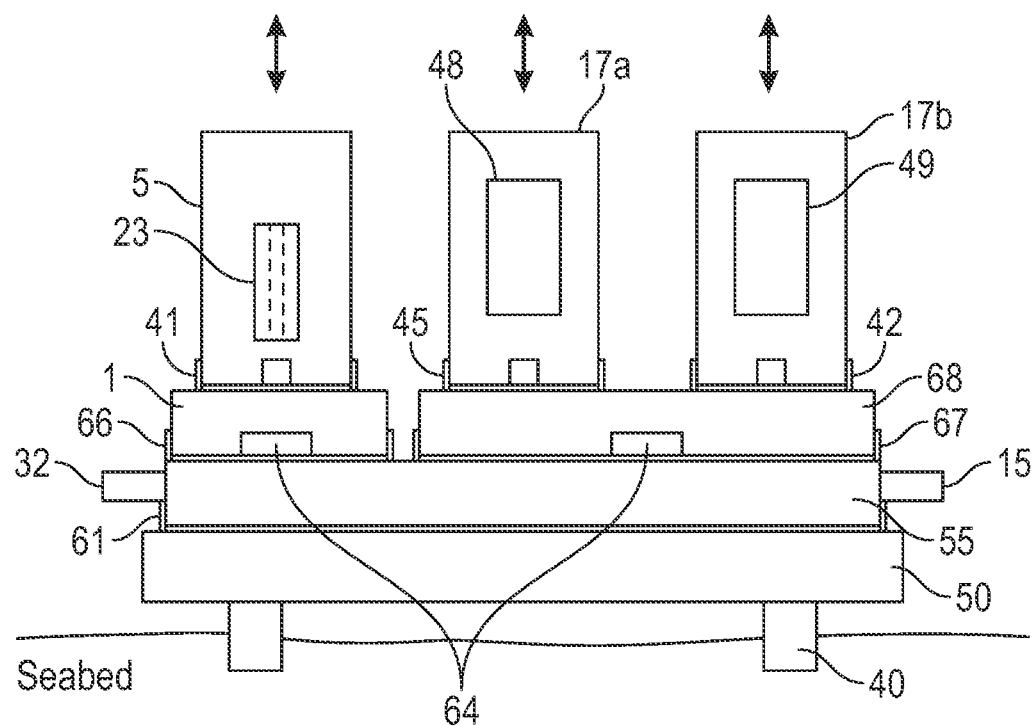
FIG. 22 is a schematic representation of a subsea desalination system with a desalination template and a pump template on a base template located on a permanent seabed foundation.

FIG. 22 shows yet another embodiment where the desalination template 1 with a desalination module zone 41 is retrievable and is located on top of a separate base template 55 with a desalination template zone. The base template 55 includes piping (not shown), is retrievable and is located on the permanent seabed foundation 50 secured to seabed anchoring elements 40. A template connection 64 forms an interface and connection between the desalination template 1 and the base template 55. The desalinated water outlet coupling 32 and the concentrated seawater outlet coupling 15 are located on the base template 55 and piping in/on the base template 55 connects the base template and the desalination template 1. A desalination template holding frame 67 on the base template 55 localizes desalination template 1 on the base template 55.

Similarly, a pump template 68 with the circulation pump module 17*b* and the transport pump module 17*a* installed in their respective pump module zones 45, 42 is installed on the base template 55 with a pump template zone. A template connection 54 forms an interface and connection between pump template 54 and the base template 55. A template holding frame 61 on the permanent seabed foundation 50 localizes the base template 55 on the permanent seabed foundation 50. A pump template holding frame 67 on the base template 55 localizes pump template 68 on the base template 55.

Figure 23:
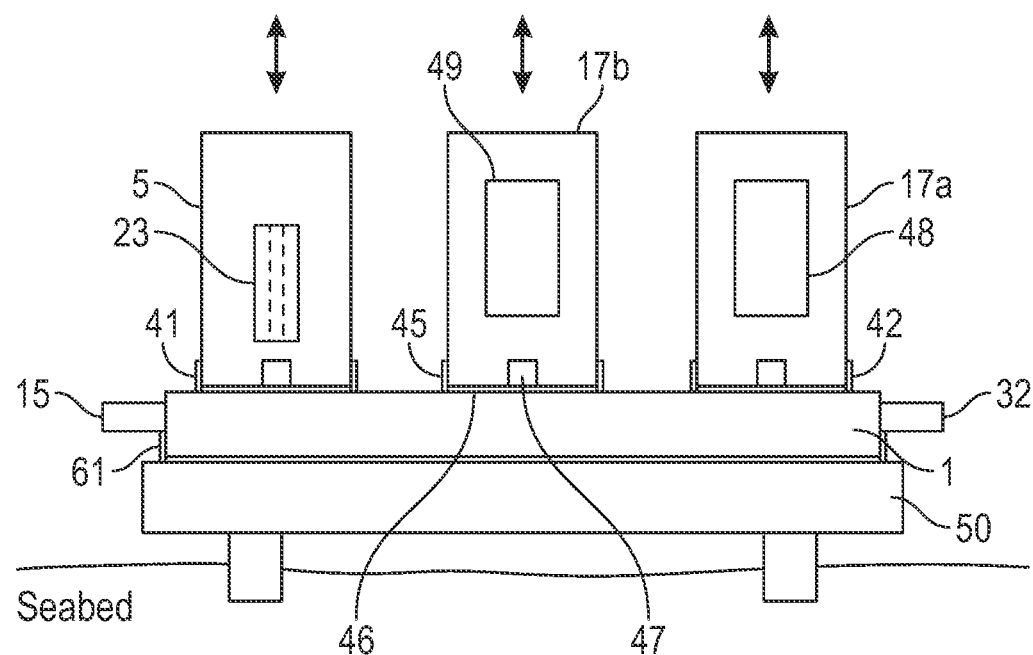
FIG. 23 is a schematic representation of a subsea desalination system with a desalination template located on a permanent seabed foundation.

FIG. 23 is a schematic representation of the subsea desalination system with a desalination template 1 located on a permanent seabed foundation 50. All the fluid connections between the desalination template 1 and the modules 5, 17a, 17b go through subsea template fluid couplings 47 and module fluid couplings 46. Additional couplings for power and control also go through the template and to the modules. The template holding frame 61 on the permanent seabed foundation 50 holds the template 1 in place.

Clearly all the components are designed for subsea use with a pressure rating to allow the components to operate reliably at the intended depth. A depth of typically more than 300 m to provide a hydrostatic pressure of about 30 bar that should be enough to overcome the osmotic pressure n for common seawater worldwide.

It is important to distribute the concentrated seawater uniformly into the sea and away from the desalinated water production system to provide an environment friendly discharge solution. A discharge solution includes a concentrated seawater outlet connected to a discharge pipe with multiple outlets or diffusers or a network of discharge pipes and tubes with multiple outlets to distribute the concentrated seawater (not shown). Such a discharge solution limits or reduces the environmental impact of the concentrated seawater.

A discharge unit (not shown) may include bespoke discharge modules located on a template to facilitate a controlled and well distributed water discharge. The discharge unit is connected to the desalinated water template. The discharge modules are retrievable and replaceable.

The desalination system described above with reference to the enclosed figures is remotely monitored, controlled and operated from an onshore control centre or from an offshore surface vessel. The control centre may be anywhere and may be connected to the onshore control centre of the desalination system e.g. via internet. The control centre is connected to the subsea system via an offshore data and instrument cable. All pumps, electrical equipment and instrumentation are typically monitored and controlled via the data and instrumentation cable, or via satellites and a floating buoy. Communication between the floating buoy and satellite could be via e.g. an antenna/sending receiving unit on the sea surface connected to the subsea equipment.

The electrical equipment and the instrumentation may be monitored and controlled from a vessel operating the desalination system.

The service vessel may commute between an onshore supply base and the location of the subsea desalination system. The onshore storage supply base may be located near the subsea desalination system where there are spare desalination modules and pump modules ready for shipping. Desalination modules are replaced on a regular basis or every time there is an issue with a certain module. The service vessel can carry one or several new/serviced desalination modules from the onshore supply base to the location of the subsea desalination system and lower the one or several desalination modules onto the desalination template. The new/serviced desalination module is then installed on the subsea template replacing the retrieved desalination module. This operation may continue until all selected subsea modules are replaced with replacement desalination modules. Replacement of the pump, control and chemical modules is executed the same way. The subsea pump, chemical and control modules are lifted onboard the supply vessel before a replacement pump, chemical or control module is lowered and installed on the subsea template replacing the retrieved pump or control module. All the retrieved modules are taken to the supply base onshore for servicing.

The above embodiments of the disclosure are described with specific modules and locations. It is however intended that the various solutions can be combined in a system in various ways and combinations. For instance, the solution with a line conveying chemicals from the water receiving facility or the solution with a module containing one or several tanks containing chemicals at the seabed can be combined with any of the embodiments. Similarly, disclosed embodiments may include a circulation pump in a dedicated module, or in a combined pumping module with both a circulation pump and a transport pump. Embodiments can be utilized as a floating desalinated water receiving facility or as a receiving facility on land, and embodiments can utilize a remote seawater entrance etc. This is likewise the case with the various templates with modular zones or template zones.

The invention claimed is:

1. A subsea desalination system comprising:
a subsea desalination template configured to be anchored to a seabed, and comprising a support frame including a lower surface and an upper surface forming at least one subsea desalination module zone defining a receptacle, one or more anchors that extend from the lower surface of the support frame to penetrate into the seabed to anchor the subsea desalination template to the seabed whereby the one or more anchors support at least some of the weight of the subsea desalination template, and at least one module fluid coupling and template piping in fluid connection with the at least one module fluid coupling;
at least one retrievable subsea desalination module for desalinating seawater, the at least one retrievable subsea desalination module configured to be retrievably landed subsea at least partially within the receptacle of the at least one subsea desalination module zone of the subsea desalination template, the at least one retrievable subsea desalination module including a subsea template fluid coupling configured to be releasably connected subsea to the at least one module fluid coupling, and at least one reverse osmosis cartridge in subsea releasable fluid connection with the subsea template fluid coupling;
at least one seawater circulation pump assembly in fluid connection with a seawater side of the at least one reverse osmosis cartridge;
at least one desalinated water transport pump assembly retrievably connectable subsea to form a fluid connection with a desalinated water side of the at least one reverse osmosis cartridge in the at least one retrievable subsea desalination module and at least one desalinated water pipeline;
at least one retrievable subsea water pump module including at least one of the at least one desalinated water transport pump assembly, and the at least one seawater circulation pump assembly;
at least one template fluid coupling on the at least one retrievable subsea water pump module, configured to be connected to at least one module fluid coupling on a template with a pump module zone; and wherein the at least one desalinated water pipeline is configured to extend to a location above a sea level.

2. The subsea desalination system of claim 1, wherein the subsea desalination template defines a permanent seabed foundation secured to the seabed by the one or more anchors.

3. The desalination system of claim 1, wherein the template with a pump module zone is the desalination template.

4. The desalination system of claim 1, wherein the at least one seawater circulation pump assembly and the at least one desalinated water transport pump assembly are located in a common retrievable subsea water pump module.

5. The desalination system of claim 1, wherein the at least one seawater circulation pump assembly is located in a retrievable subsea seawater circulation pump module;

the at least one desalinated water transport pump assembly is located in a retrievable subsea desalinated water transport pump module; and wherein the retrievable transport pump module is located in a desalinated water transport pump module zone and the retrievable subsea circulation pump module is located in a circulation pump module zone.

6. The desalination system of claim 5, further including a separate filtering and pumping station wherein a seawater inlet filter and the at least one circulation pump assembly in a circulation pump module is located on the filtering and pumping station upstream and in fluid connection with the desalination template, pumping seawater through the at least one retrievable subsea desalination module.

7. The desalination system of claim 1, further including at least one retrievable control module located in at least one control module zone on the desalination template.

8. The desalination system of claim 1, wherein the at least one retrievable subsea desalination module includes a seawater inlet filter arranged to filter seawater entering the at least one reverse osmosis cartridge.

9. The desalination system of claim 8, wherein the seawater inlet filter is located on top of the at least one retrievable subsea desalination module.

10. The desalination system of claim 1, wherein the template with the pump module zone is a separate pumping template, and wherein a desalinated water flow path extends between the separate pumping template and the subsea desalination template.

11. The desalination system of claim 1, wherein at least one separate pumping template with the at least one pumping module is located on a downstream side of the subsea desalination template and includes a desalinated water inlet and a desalinated water outlet, whereby the separate pumping template with the at least one pumping module is configured to convey the desalinated water from the desalination template.

12. A method exchanging a used subsea desalination module installed on a subsea desalination system, the method comprising:

identifying that the used subsea desalination module requires service based on regular scheduled intervals or parameters selected from the group of parameters: desalinated water flow rate, water pressure drop over the subsea desalination module and desalinated water salinity;

providing a vessel above the subsea desalination system;

lowering a subsea desalination module lifting means onto the used subsea desalination module;

securing the subsea desalination module lifting means to the used subsea desalination module;

releasing subsea the used subsea desalination module from a subsea desalination template comprising a support frame including a lower surface and an upper surface forming at least one subsea desalination module zone defining a receptacle, and one or more anchors that extend from the lower surface of the support frame to penetrate into a seabed to anchor the subsea desalination template to the seabed whereby at least some of the weight of the subsea desalination template is supported by the one or more anchors;

fluidically disconnecting subsea at least one subsea template fluid coupling of the used subsea desalination module from at least one module fluid coupling of the subsea desalination template;

lifting the subsea desalination module lifting means and the used subsea desalination module on to the vessel;

lowering the subsea desalination module lifting means and an exchange subsea desalination module whereby the exchange subsea desalination module is landed subsea at least partially within the receptacle defined by the at least one subsea desalination module zone of the subsea desalination template;

securing the exchange subsea desalination module to the subsea desalination template;

fluidically disconnecting subsea at least one subsea template fluid coupling of the used subsea desalination module from at least one module fluid coupling of the subsea desalination template; and releasing the subsea desalination module lifting means from the exchange subsea desalination module.

13. A subsea desalination system comprising:

a seabed foundation comprising a template holding frame and one or more anchors that extend from the template holding frame to penetrate into a seabed to anchor the seabed foundation to the seabed whereby the one or more anchors support at least some of the weight of the seabed foundation;

a subsea desalination template retrievably landable onto the template holding frame of the seabed foundation to releasably couple the subsea desalination template to the seabed foundation, and comprising a support frame including a lower surface landable on the template holding frame of the seabed foundation and an upper surface forming at least one subsea desalination module zone defining a receptacle, and at least one module fluid coupling and template piping in fluid connection with the at least one module fluid coupling;

at least one retrievable subsea desalination module for desalinating seawater, the at least one retrievable subsea desalination module configured to be retrievably landed subsea at least partially within the receptacle of the at least one subsea desalination module zone of the subsea desalination template, the at least one retrievable subsea desalination module including a subsea template fluid coupling configured to be releasably connected subsea to the at least one module fluid coupling, and at least one reverse osmosis cartridge in subsea releasable fluid connection with the subsea template fluid coupling;

at least one seawater circulation pump assembly in fluid connection with a seawater side of the at least one reverse osmosis cartridge;

at least one desalinated water transport pump assembly retrievably connectable subsea to form a fluid connection with a desalinated water side of the at least one reverse osmosis cartridge in the at least one retrievable subsea desalination module and at least one desalinated water pipeline;

at least one retrievable subsea water pump module including at least one of the at least one desalinated water transport pump assembly, and the at least one seawater circulation pump assembly;

at least one template fluid coupling on the at least one retrievable subsea water pump module, configured to be connected to at least one module fluid coupling on a template with a pump module zone; and wherein the at least one desalinated water pipeline is configured to extend to a location above a sea level.

14. The subsea desalination system of claim 13, further comprising a subsea base template in fluid connection with the at least one desalinated water pipeline and a concentrated seawater outlet.

15. The subsea desalination system of claim 14, wherein the subsea base template is configured to be located on top of the seabed foundation.

16. The subsea desalination system of claim 13, wherein the subsea foundation defines a permanent seabed foundation secured to the seabed by the one or more anchors.

\* \* \* \* \*